United States Patent
Deng et al.

(10) Patent No.: US 12,393,551 B2
(45) Date of Patent: *Aug. 19, 2025

(54) SELECTING SUBSCRIBING COMPUTING NODE TO EXECUTE DATA STORAGE PLAN FOR DATA SHARD

(71) Applicant: MICRO FOCUS LLC, Wilmington, DE (US)

(72) Inventors: Ning Deng, Cambridge, MA (US); Yuanzhe Bei, Cambridge, MA (US); Alexander Kalinin, Cambridge, MA (US)

(73) Assignee: Micro Focus LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,583

(22) Filed: Mar. 8, 2024

(65) Prior Publication Data

US 2024/0211440 A1    Jun. 27, 2024

Related U.S. Application Data

(63) Continuation of application No. 17/578,644, filed on Jan. 19, 2022, now Pat. No. 12,019,588.

(51) Int. Cl.
*G06F 7/00*       (2006.01)
*G06F 16/17*      (2019.01)
(Continued)

(52) U.S. Cl.
CPC ........ *G06F 16/172* (2019.01); *G06F 16/1734* (2019.01); *G06F 16/182* (2019.01)

(58) Field of Classification Search
CPC .. G06F 16/172; G06F 16/1734; G06F 16/182; G06F 16/24552; G06F 16/278;
(Continued)

(56) References Cited

U.S. PATENT DOCUMENTS 8,700,674 B2    4/2014  Bear et al.
9,830,111 B1 *  11/2017 Patiejunas ............. G06F 3/0625
(Continued)

OTHER PUBLICATIONS

"Vertica Knowledge Base Article: Tuple Move Best Practices," Micro Focus International plc, Nov. 15, 2018, 12 pages [retrieved online from: www.vertica.com/kb/Tuple-Mover-Best-Practices/Content/BestPractices/Tuple-Mover-Best-Practices.htm].
(Continued)

*Primary Examiner* — Md I Uddin
(74) *Attorney, Agent, or Firm* — Sheridan Ross P.C.

(57) ABSTRACT

A distributed database system maintains a database including a data shard for which a primary computing node is responsible. The primary computing node identifies a data storage plan for the data shard. The plan identifies a file subset of data storage files of the shard to be merged into a larger data storage file, and a node subset of computing nodes of the system that subscribe to the data shard. The primary node identifies which computing nodes of the node subset each have sufficient computing resources to execute the plan, as candidate computing nodes. The primary node identifies which files of the file subset each candidate computing node locally caches. The primary node selects one candidate computing node to execute the plan, based on the files of the file subset that each candidate computing node locally caches. The primary node causes the selected candidate computing node to execute the plan.

16 Claims, 6 Drawing Sheets

(51) Int. Cl.
  *G06F 16/172* (2019.01)
  *G06F 16/182* (2019.01)
(58) Field of Classification Search
  CPC .................. G06F 16/2471; H04L 67/109;
                                              H04L 67/1097
  USPC ......... 705/7.12, 7.13, 7.22, 7.25, 7.29, 7.31,
           705/7.35, 28; 707/688, 705, 737, 769,
           707/770, 802, 649, 661, 667, 741, 752,
           707/823, 999.01, 999.204; 709/202, 203,
                       709/213, 219, 223, 224, 225, 226
  See application file for complete search history.

(56) References Cited

U.S. PATENT DOCUMENTS

| | | | | |
|---|---|---|---|---|
| 2015/0261468 | A1* | 9/2015 | Khoyi | G06F 3/0653 |
| | | | | 711/114 |
| 2017/0295246 | A1* | 10/2017 | Georgiou | H04L 43/0864 |
| 2022/0291858 | A1* | 9/2022 | DeWitt | G06F 3/064 |
| 2023/0125030 | A1* | 4/2023 | Darji | G06F 9/44505 |
| | | | | 713/100 |

OTHER PUBLICATIONS

Vandiver et al. "Eon Mode: Bringing the Vertica Columnar Database to the Cloud," Proceedings of the 2018 International Conference on Management of Data, Jun. 2018, 13 pages.

* cited by examiner

SELECTING SUBSCRIBING COMPUTING NODE TO EXECUTE DATA STORAGE PLAN FOR DATA SHARD

BACKGROUND

Data is the lifeblood of many entities like business and governmental organizations, as well as individual users. Large-scale storage of data in an organized manner is commonly achieved using databases. Databases are collections of information that are organized for easy access, management, and updating. Database systems, which may also be referred to as database management systems, are implemented by computing systems and used to create and manage databases.

DETAILED DESCRIPTION

Figure 1:
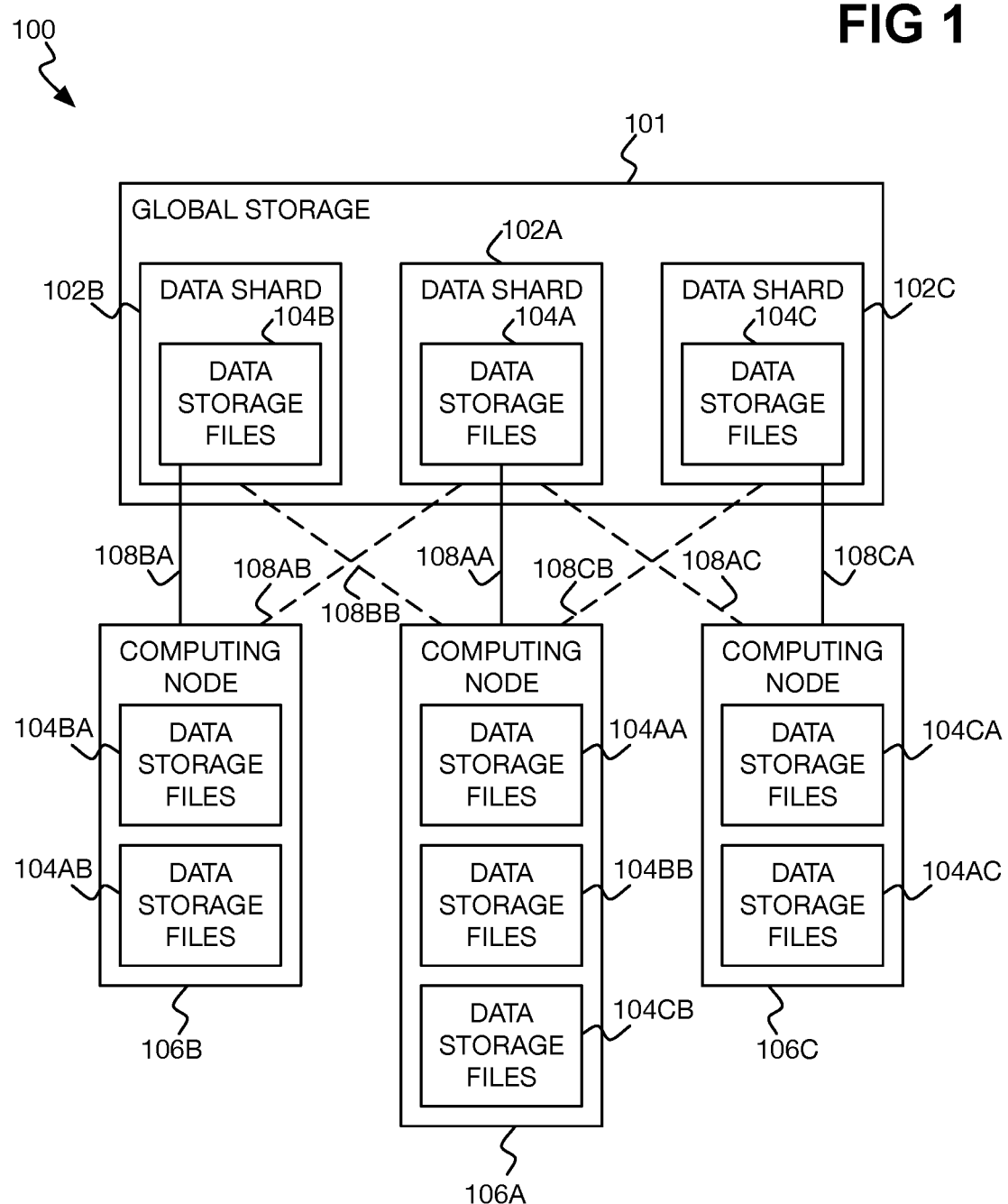
FIG. 1 is a diagram of an example distributed database system.

As noted in the background, databases created and managed by database systems store data. A database system may be a distributed database system that includes a global storage storing data shards of a database, where each data shard stores data storage files that include the data of the database. The data storage files stored by each data shard are different. That is, the data of the database stored in one data shard is not stored in any other data shard.

A distributed data system further includes computing nodes that have shared access to the global storage. Each computing node is responsible for maintaining a data shard, and each data shard is maintained by one computing node. The computing node that maintains a data shard is referred to as the primary computing node for the data shard. The primary computing node is considered as subscribing to the data shard for which it is responsible, and may locally cache the data storage files of the shard.

Other computing nodes may also subscribe to a data shard, in addition to the primary computing node. These other computing nodes similarly may locally cache the data storage files of the data shard. Therefore, each data shard has a subset of computing nodes that subscribe to the data shard and that can locally cache the data storage files of the shard. The subset of nodes includes at least the primary computing nodes and may also include one or more other of the computing nodes.

In a distributed database system, queries are performed against the database in a distributed manner by the computing nodes of the system. A query plan may be generated for a query. The query plan is executed to perform the query. That is, executing the query plan returns data of the database that satisfies the query.

As queries are performed, the data stored at each data shard may become fragmented over multiple data storage files. Therefore, at times the primary computing node for a data shard may generate a data storage plan to merge a subset of the data storage files into a single larger file for efficiency. The data storage plan is not to be confused with a query plan that is generated for and executed to perform a query. In general, the primary computing node for a data shard executes the data storage plan for this shard.

However, the primary computing node may not be the optimal subscribing computing node to execute the data storage plan. For example, the primary computing node may be currently processing queries, and therefore have insufficient computing resources to execute the plan, resulting in inefficient plan execution. As another example, the primary computing node may not be the subscribing computing node that maximally locally caches the subset of data storage files subject to the data storage plan, by number of files and/or by file size, which also results in inefficient plan execution.

Techniques described herein ameliorate these and other issues, by selecting the subscribing computing node of a data shard that is most efficiently able to execute a data storage plan for the data shard. The subscribing computing nodes of the data shard that have sufficient computing resources to execute the data storage plan are identified as candidate computing nodes. Which data storage files subject to the data storage plan each candidate computing node locally caches are identified, on which basis one of the selected candidate computing nodes is selected to execute the plan.

The computing node that executes a data storage plan for a data shard may thus be a computing node that subscribes to the shard other than the primary computing node for the data shard. The primary computing node identifies (e.g., generates) the data storage plan, and selects which subscribing computing node is to execute the data storage plan. If the selected subscribing computing node is not the primary computing node, the primary computing node provides the data storage plan to the selected node for execution.

FIG. 1 shows an example distributed database system 100. The distributed database system 100 in one implementation may be the Vertica database management system available from Vertica Systems, of Cambridge, Mass., which is a subsidiary of Micro Focus International plc, of Newbury, U.K. The distributed database system 100 includes a global storage 101, which may be implemented as a storage-array network (SAN) of storage devices like hard disk drives, or in another manner.

The global storage 101 stores data shards 102A, 102B, and 102C, collectively referred to as the data shards 102 of a database. In the example of FIG. 1, there are three data shards 102, but more generally there is at least one data shard 102 and typically tens if not hundreds or more data shards 102. The data shards 102A, 102B, and 102C respectively store data storage files 104A, 104B, and 104C, which are collectively referred to as the data storage files 104.

More generally, each data shard 102 stores corresponding data storage files 104. That is, the data storage files 104A includes multiple such files, such as thousands, tens of thousands, or more, as do the data storage files 104B and the data storage files 104C. The data of the database maintained by the distributed database system 100 are stored in the data storage files 104 of the data shards 102. The data stored at each data shard 102 is not stored at any other data shard 102.

The distributed database system 100 also includes computing nodes 106A, 106B, and 106C, collectively referred to as the computing nodes 106. In the example of FIG. 1, there are three computing nodes 106, but more generally there is at least one computing node 106 and typically tens if not hundreds or more computing nodes 106. In the example, the number of computing nodes 106 is equal to the number of data shards 102, but in general, the number of computing nodes 106 may be less than, equal to, or greater than the number of data shards 102.

Each computing node 106 can be a computing device, such as a server computing device, having one or multiple processors, memory, and its own local storage devices such as hard disk drives and solid-state drives (SSDs), among other types of hardware. The local storage devices of each computing node 106 may not be accessible by the other computing nodes 106. Each computing node 106 is communicatively coupled to the global storage 101, such as over a network.

Each data shard 102 has a primary computing node 106 that is responsible for maintaining the data storage files 104 stored on that data shard 102. In the example, the computing node 106A is the primary computing node for the data shard 102A responsible for maintaining the data storage files 104A, per solid line 108AA. Similarly, the computing node 106B is the primary computing node for the data shard 102B responsible for maintaining the data storage files 104B per solid line 108BA, and the computing node 106C is the primary computing node for the data shard 102C responsible for maintaining the data storage files 104C per solid line 108CA.

More generally, however, a computing node 106 may be the primary computing node for zero or more data shards 102. For example, a computing node may be the primary computing node for more than one data shard 102, or may not be the primary computing node for any data shard 102. However, each data shard 102 has just one primary computing node 106, even if that computing node 106 is the primary computing node for one or more other data shards 102.

The primary computing node 106 for a data shard 102 is a subscribing computing node of that shard 102. Each computing node 106 can also be a subscribing computing node of one or more shards 102 for which it is not the primary computing node. For example, the computing node 106A also subscribes to the data shard 102B per the dashed line 108BB and to the data shard 102C per the dashed line 108CB. Similarly, the computing nodes 106B and 106C also subscribe to the data shard 102A per the dashed lines 108AB and 108AC, respectively.

Each computing node can locally cache the data storage files 104 of each data shard 102 to which it subscribes. For example, the computing node 106A locally caches data storage files 104AA, 104BB, and 104CB, which are subsets of the data storage files 104A, 104B, and 104C of the data shards 102A, 102B, and 102C, respectively. The computing node 106B locally caches data storage files 104BA and 104AB, which are subsets of the data storage files 104B of the data shards 102B and 102A, respectively. The computing node 106C locally caches data storage files 104CA and 104AC, which are subsets of the data storage files 104C and 104A of the data shards 102C and 102A, respectively.

Stated another way, the data shard 102A has three subscribing computing nodes 106A, 106B, and 106C that locally cache different subsets of the data storage files 104A of the shard 102A, as the data storage files 104AA, 104AB, and 104AC, respectively. The data shard 102B has two subscribing computing nodes 106B and 106A that locally cache different subsets of the data storage files 104B of the shard 102B, as the data storage files 104BA and 104BB, respectively. The data shard 102C has two subscribing computing nodes 106C and 106A that locally cache different subsets of the data storage files 104C of the shard 102C, as the data storage files 104CA and 104CB, respectively.

A query can be executed in a distributed fashion against the data of the database stored in the data storage files 104 of the data shards 102 by the computing nodes 106 that subscribe to the data shards 102 storing the data subject to the query. As queries are executed, data of the database may be fragmented into ever-smaller data storage files 104 within the data shards 102. Therefore, periodically the primary computing node 106 for each data shard 102 may generate a data storage plan to merge a subset of smaller data storage files 104 of the data shard 102 into a single larger data storage file 104 for efficiency purposes.

Figure 2:
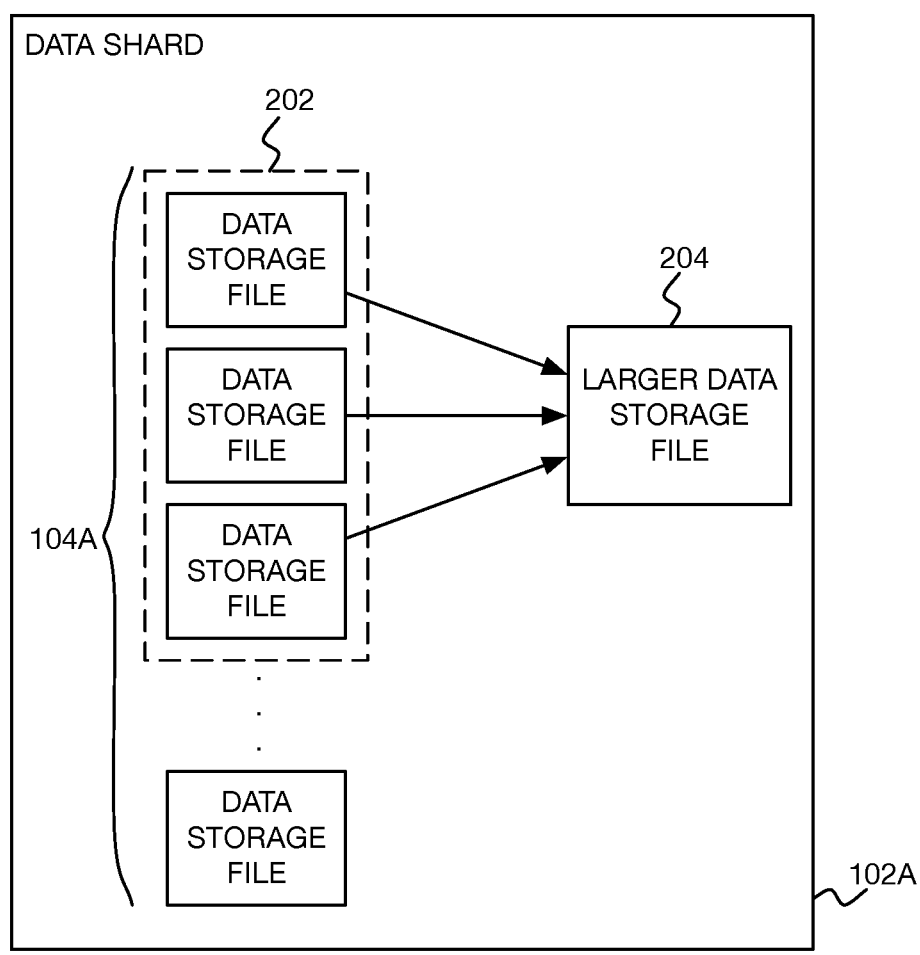
FIG. 2 is a diagram of example execution of a data storage plan for a data shard of a distributed database system.

FIG. 2 shows example execution of a data storage plan for the data shard 102A having the primary computing node 106A. The data shard 102A includes multiple data storage files 104A, of which the data storage files 202 are identified for merger by the data storage plan generated by the computing node 106A. The data storage files 202 are a subset of the data storage files 104A, which may be referred to as a file subset in this respect. The file subset can include all the data storage files 104A.

Upon execution of the data storage plan, by any subscribing computing node 106 of the data shard 102A (i.e., not necessarily the primary computing node 106A), the data storage files 202 are merged into a single larger data storage file 204. The data storage file 204 replaces the data storage files 202 within the data shard 102A. That is, the data storage file 204 is one of the data storage files 104A of the data shard 102A, and the individual data storage files 202 that the data storage file 204 replaces are deleted after merger into the storage file 204.

Figure 3:
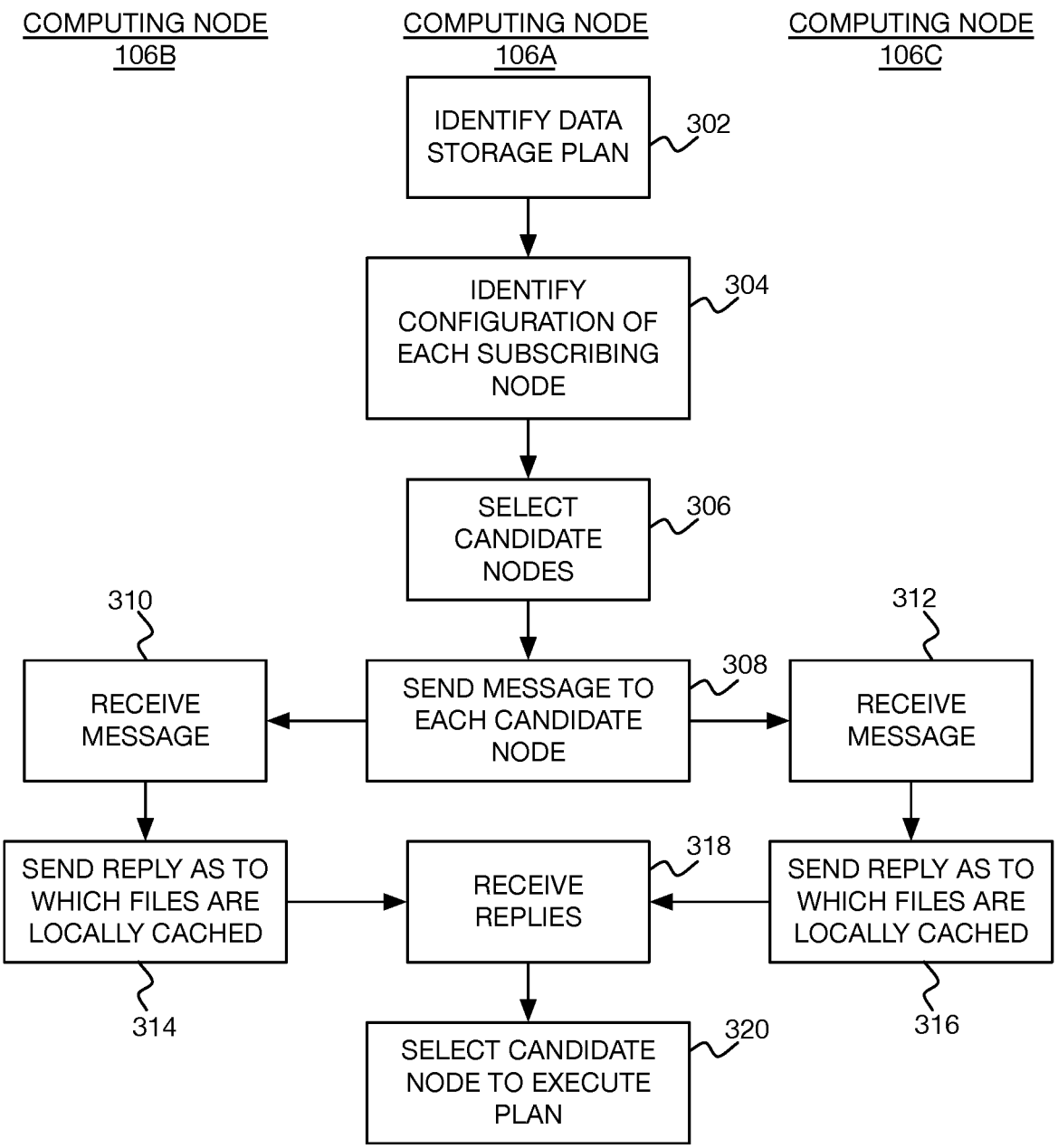
FIG. 3 is a flowchart of an example method for selecting a subscribing computing node of a data shard of a distributed database system to execute a data storage plan for the data shard.

FIG. 3 shows an example method 300 for selecting a subscribing computing node 106 of a data shard 102 to execute a data storage plan for the data shard 102. The method 300 is described in relation to a data storage plan for the data shard 102A having subscribing computing nodes 106A, 106B, and 106C, of which the computing node 106A is the primary computing node. The parts of the method 300 in the left, center, and right columns are respectively performed by the computing nodes 106B, 106A, and 106C.

The primary computing node 106A first identifies the data storage plan (302). The computing node 106A may generate the data storage plan, for instance, or otherwise receive the data storage plan. The data storage plan identifies the subset of the data storage files 104A that are subject to the data storage plan, which are the data storage files 202 in the example.

The data storage plan also identifies the subscribing computing nodes 106 of the data shard 102A. The subscribing computing nodes 106 are a subset of all the computing nodes 106 of the distributed database system 100, which may be referred to as a node subset in this respect. In the example, the subscribing computing nodes 106 of the data shard 102A are the computing nodes 106A, 106B, and 106C. The node subset can thus include all the computing nodes 106 of the distributed database system 100.

The primary computing node 106A identifies the configuration of each subscribing computing node 106 of the data shard 102A, including itself (304). The configuration of a computing node 106 may be identified within a resource pool of the distributed database system 100, and specifies the current utilization of that computing node 106. The current utilization may be measurable by processor, memory, and/or network utilization of the computing node 106, for instance.

The primary computing node 106A then selects candidate computing nodes 106 from the subscribing computing nodes 106 of the data shard 102A, which may include itself (306). The primary computing node 106A may select as one of the candidate computing nodes 106 each subscribing computing node 106 having a current utilization that satisfies an availability criterion. For instance, if a subscribing computing node 106 has processor utilization, memory utilization, and network utilization less than respective thresholds, the computing node 106 may be selected as a candidate computing node 106. In the example, it is assumed that each subscribing computing node 106A, 106B, and 106C is selected as a candidate computing node 106.

In this way, the primary computing node 106A identifies which subscribing computing nodes 106 of the data shard 102A have sufficient computing resources to execute the data storage plan. The computing node 106A then has to select which of these candidate computing nodes 106 is to actually execute the data storage plan. This selection is based on the data storage files 202 of the data shard 102A subject to the data storage plan that each candidate computing node 106 locally caches. The primary computing node 106A already knows the data storage files 104AA of the data storage files 104A that it locally caches, and thus can identify which of the data storage files 202 that the computing node 106A locally caches.

To identify which of the data storage files 202 of the data shard 102A subject to the data storage plan that the other candidate computing nodes 106B and 106C respectively locally cache, the primary computing node 106A sends messages to these other candidate computing nodes 106B and 106C (308). Specifically, the computing node 106A sends a message to the computing node 106B to receive information regarding which of the data storage files 202 are part of the data storage files 104AB locally cached by the computing node 106B, which receives this message (310). The computing node 106A likewise sends a message to the computing node 106C to receive information regarding which of the data storage files 202 are part of the data storage files 104AC locally cached by the node 106C, which receives this message (312).

The candidate computing node 106B sends in reply the requested information regarding which of the data storage files 202 of the data shard 102A that are subject to the data storage plan the computing node 106B locally caches (314). Similarly, the candidate computing node 106C sends in reply the requested information regarding which of the data storage files 202 of the data shard 102A the computing node 106C locally caches (316). The primary computing node 106A thus receives these replies (318).

The information regarding which of the data storage files 202 of the data shard 102 that are subject to the data storage plan each candidate computing node 106 locally caches can include either or both of the following information. First, the information may include the number of the data storage files 202 that a candidate computing nodes 106 locally caches. Second, the information may include the size of the data storage files 202 that a candidate computing node 106 locally caches. For instance, the total size of the locally cached data storage files 202 may be provided by a candidate computing node 106.

The primary computing node 106A selects a candidate computing node 106 to execute the data storage plan based on which of the data storage files 202 of the data shard 102 that are subject to the data storage plan each candidate computing node 106 locally caches (320). In one implementation, the candidate computing node 106 locally caching the greatest number of the data storage files 202 is selected to execute the data storage plan. In another implementation, the candidate computing node 106 locally caching the largest size of the data storage files is selected to execute the data storage plan.

In a third implementation, the primary computing node 106A may compute a score for each candidate computing node 106 based on both the number of and the size of the data storage files 202 that the candidate computing node 106 locally caches, and select the candidate computing node 106 having the highest score to execute the data storage plan. For example, the number of the data storage files 202 that a candidate computing node 106 locally caches may be divided by the total number of the data storage files 202, and the resulting quotient normalized between 1 and 100. Likewise, the size of the data storage files 202 that the candidate computing node 106 locally caches may be divided by the size of all the data storage files 202, and the resulting quotient normalized between 1 and 100.

In this example, the two quotients for each candidate computing node 106 may be added together or averaged to generate the score for the candidate computing node 106 in question. Before being added together or averaged, each quotient may be weighted by a respective weight. For example, the quotient pertaining to the number of the data storage files 202 that a candidate computing node 106 locally caches may be weighted higher or lower than the quotient pertaining to the size of the data storage files 202 that the candidate computing node 106 locally caches. In the former case, the number of the data storage files 202 that are locally cached contributes to the score for the candidate computing node 106 more than their size, whereas in the latter case, the size of the data storage files 202 that are locally cached contributes to the score more than their number.

If the primary computing node 106A for the data shard 102A is one of the candidate computing nodes 106, then either the computing node 106A or another candidate computing node 106 may be selected to execute the data storage plan. In the example, the candidate computing node 106A, 106B, or 106C may thus be selected to execute the data storage plan. However, if the primary computing node 106A were not one of the candidate computing nodes 106, then the candidate computing node 106B or 106C is selected to execute the data storage plan.

Figure 4:
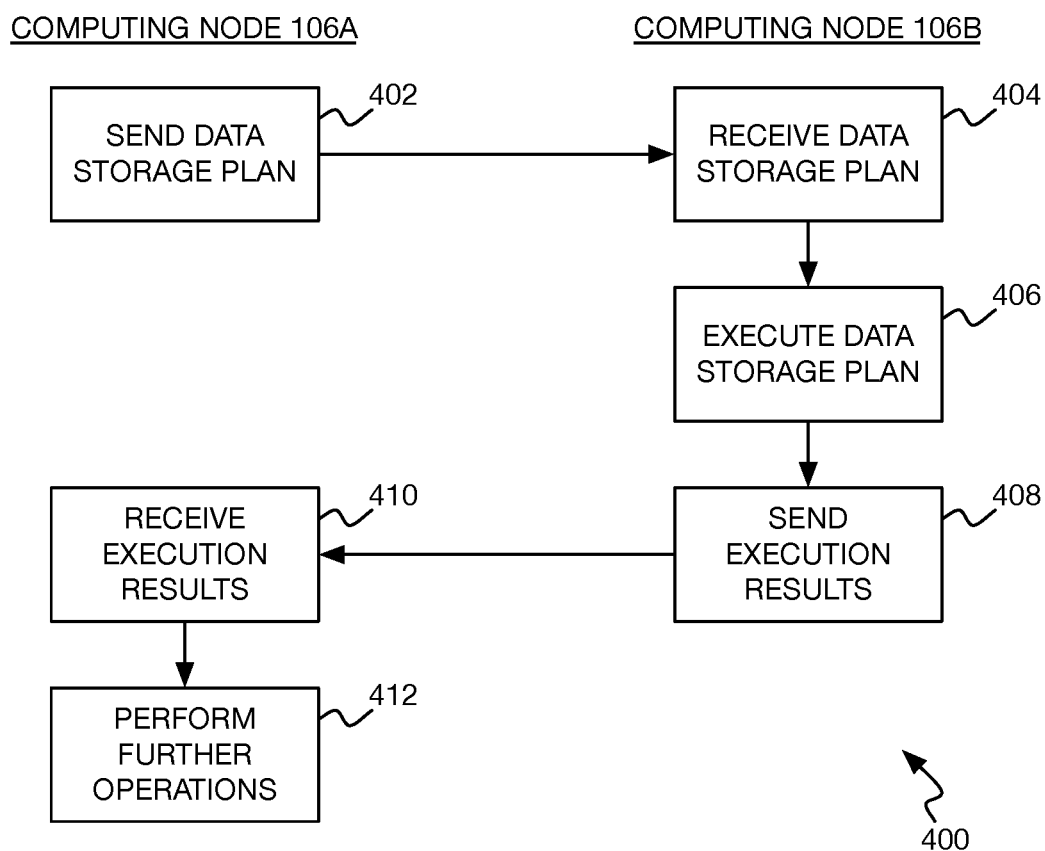
FIG. 4 is a flowchart of an example method for execution of a data storage plan for a data shard of a distributed database system by a subscribing computing node other than a primary computing node responsible for the data shard.

FIG. 4 shows an example method 400 that is performed in the case in which the candidate computing node 106 that is selected to execute a data storage plan for a data shard 102 is not the primary computing node 106 for that shard 102. The method 400 is described in relation to a data storage plan for the data shard 102A having the primary computing node 106A, where the subscribing computing node 106B has been selected to execute the data storage plan. The parts of the method 300 in the left and right columns are respectively performed by the computing nodes 106A and 106B.

The primary computing node 106A sends the data storage plan for execution to the selected computing node 106B (402), which receives the data storage plan (404). The computing node 106B then executes the data storage plan to merge the data storage files 202 of the data shard 102A identified by the data storage plan into a single larger data storage file 204 (406). The computing node 106B sends the results of data storage plan execution to the computing node 106A (408), which receives the execution results (410). The execution results may indicate whether or not execution of the data storage plan was successful, for instance, as well as metadata regarding the larger data storage file 204.

The primary computing node 106A may perform further operations regarding the data shard 102A, based or depending on the data storage plan execution results (412). As one example, the primary computing node 106A may transfer the larger data storage file 204 that was generated to other subscribing computing nodes 106 of the data shard 102A besides the selected computing node 106 that executed the data storage plan. The data storage file 204 may be provided in a peer-to-peer manner, for instance.

Figure 5:
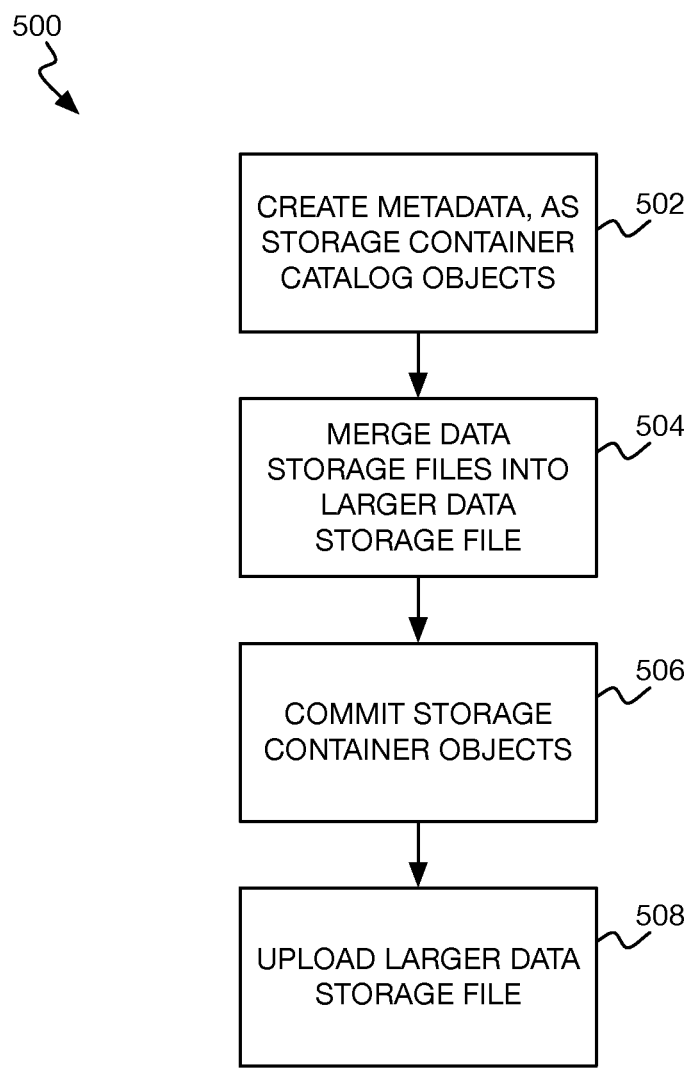
FIG. 5 is a flowchart of an example method for executing a data storage plan for a data shard of a distributed database system, in detail.

FIG. 5 shows in detail an example method 500 for executing a data storage plan. The method 500 is described in relation to a data storage plan for the data shard 102A. The primary computing node 106A or another subscribing computing node 106B or 106C may perform the method 500, depending on which subscribing computing node 106 was selected to execute the data storage plan. For instance, in the example of the method 400, the computing node 106B performs the method 500 in part 406.

The method 500 includes creating metadata for the single larger data storage file 204 to be created upon merger of the data storage files 202 of the data shard 102A that are subject to the data storage plan (502). The metadata may be created as storage container catalog objects that are stored within a database in the case in which the distributed database system 100 is the aforementioned Vertica database management system. The method 500 then includes merging the data storage files 202 together to create the data storage file 204 (504).

Once the data storage files 202 have been merged into the data storage file 204, the method 500 includes committing the storage container objects containing the metadata regarding the data storage file 204 to the database (506). Such commitment effectively deletes or dereferences the now-duplicative data storage files 202 if still present. The method 500 concludes by uploading the data storage file 204 to the global storage 101 (508), where the data storage file 204 is part of the data shard 102A and thus one of the data storage files 104A of the shard 102A. The other subscribing nodes 106 of the data shard 102A are now able to access the data storage file 204.

The parts of the method 500 may be performed in an order other than that which has is shown in FIG. 5. For instance, part 504 may be performed first, and then part 502 may be performed. Finally, part 508 may be performed, and then part 506.

Figure 6:
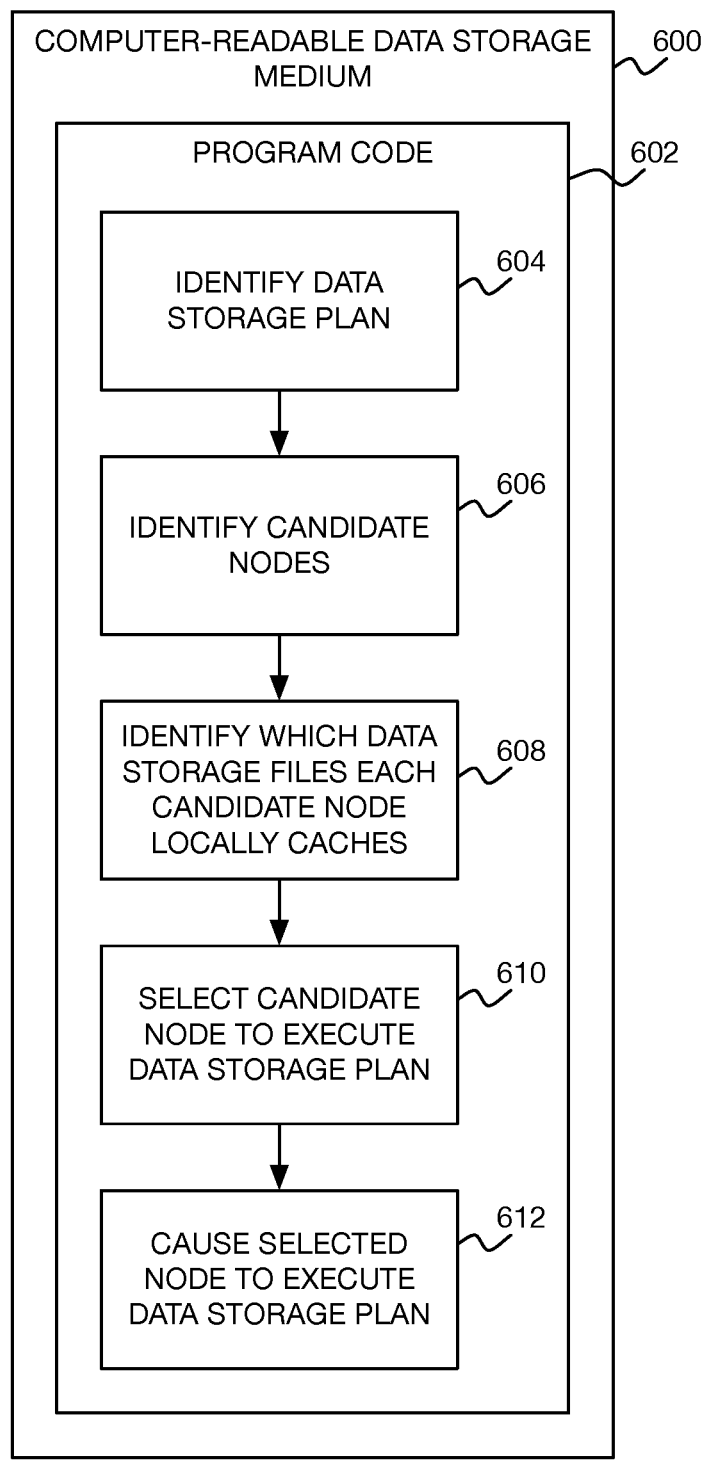
FIG. 6 is a diagram of an example non-transitory computer-readable data storage medium.

FIG. 6 shows an example non-transitory computer-readable data storage medium 600 storing program code 602 executable by a primary computing node 106 for a data shard 102 to perform processing. The processing includes identifying a data storage plan for the data shard 102 (604). The data storage plan identifies a file subset of the data storage files 104 of the data shard 102 to be merged into a larger data storage file 204. The data storage plan further identifies a node subset of the computing nodes 106 of the distributed database system 100 subscribing to the data shard 102, including the primary computing node 106.

The processing includes identifying which computing nodes 106 of the node subset each have sufficient computing resources to execute the data storage plan, as candidate computing nodes 106 (606). The processing includes identifying which data storage files 104 of the file subset each candidate computing node 106 locally caches (608). The processing includes selecting one of the candidate computing nodes 106 to execute the data storage plan, based on the data storage files 104 of the file subset that each candidate computing node locally 106 caches (610), and causing the selected one of the candidate computing nodes 106 to execute the data storage plan (612).

Techniques have been describing for selecting a subscribing computing node to execute a data storage plan for a data shard in such a way that the selected computing node may not necessarily be the primary computing node for the shard. Rather, the subscribing computing node is selected so that the data storage plan will be executed most efficiently. This means that overall performance of a distributed database system can improve, since background file maintenance tasks implemented by the data storage plans are performed more quickly and in a less burdensome manner on the system.

We claim:

1. A non-transitory computer-readable data storage medium storing program code executable by a primary computing node of a distributed database system to perform processing, the distributed database system maintaining a database that includes a data shard for which the primary computing node is responsible, the processing comprising:
   receiving or generating a data storage plan for the data shard, the data storage plan identifying a file subset of a plurality of data storage files of the data shard to be merged into a larger data storage file, the data storage plan further identifying a node subset of a plurality of computing nodes of the distributed database system subscribing to the data shard, the subset including the primary computing node;
   identifying which computing nodes of the node subset each have a current utilization satisfying an availability criterion, as candidate computing nodes, comprising:
      identifying a configuration of each computing node of the node subset within a resource pool, the configuration specifying the current utilization of the computing node; and
      selecting each computing node of which the current utilization satisfies the availability criterion, as one of the candidate computing nodes;
   identifying which data storage files of the file subset each candidate computing node locally caches, comprising:
      sending a message to the candidate computing node to receive information regarding the data storage files of the file subset that the candidate computing node locally caches; and
      receiving a reply from the candidate computing node including the information regarding the data storage files of the file subset that the candidate computing node locally caches;
   selecting one of the candidate computing nodes to execute the data storage plan, based on the data storage files of the file subset that each candidate computing node locally caches; and
   causing the selected one of the candidate computing nodes to execute the data storage plan by merging the data storage files of the file subset into the larger data storage file and uploading the larger data storage file to a global shared storage accessible by the computing nodes of the distributed database system,
   wherein execution of the data storage plan resolves fragmentation of data stored in the data shard resulting from queries being performed against the data.

2. The non-transitory computer-readable data storage medium of claim 1, wherein the information comprises one or more of:

a number of the data storage files of the file subset that the candidate computing node locally caches; and a size of the data storage files of the file subset that the candidate computing node locally caches.

3. The non-transitory computer-readable data storage medium of claim 1, wherein selecting the one of the candidate computing nodes to execute the data storage plan, based on the data storage files of the file subset that each candidate computing node locally caches, comprises:

selecting the one of the candidate computing nodes to execute the data storage plan as the candidate computing node locally caching a greatest number of the data storage files of the file subset.

4. The non-transitory computer-readable data storage medium of claim 1, wherein selecting the one of the candidate computing nodes to execute the data storage plan, based on the data storage files of the file subset that each candidate computing node locally caches, comprises:

selecting the one of the candidate computing nodes to execute the data storage plan as the candidate computing node locally caching a largest size of the data storage files of the file subset.

5. The non-transitory computer-readable data storage medium of claim 1, wherein selecting the one of the candidate computing nodes to execute the data storage plan, based on the data storage files of the file subset that each candidate computing node locally caches, comprises:

for each candidate computing node, computing a score based on a number of the data storage files that the candidate computing node locally caches and based on a size of the data storage files that the candidate computing node locally caches;

selecting the one of the candidate computing nodes to execute the data storage plan as the candidate computing node having a highest score.

6. The non-transitory computer-readable data storage medium of claim 1, wherein the selected one of the candidate computing nodes to execute the data storage plan is other than the primary computing node, and wherein causing the selected one of the candidate computing nodes to execute the data storage plan comprises:

sending the data storage plan to the selected one of the candidate computing nodes for execution.

7. The non-transitory computer-readable data storage medium of claim 6, wherein the processing further comprises:

receiving data storage plan execution results from the selected one of the candidate computing nodes after execution of the data storage plan; and performing further operations regarding the data shard, based on the data storage plan execution results.

8. The non-transitory computer-readable data storage medium of claim 1, wherein the selected one of the candidate computing nodes to execute the data storage plan is the primary computing node, and wherein causing the selected one of the candidate computing nodes to execute the data storage plan comprises:

executing the data storage plan.

9. A method comprising:

receiving, by a computing node of a distributed database system maintaining a database including a data shard to which a node subset of a plurality of computing nodes of the distributed database system including the computing node and a primary computing node responsible for the data shard, a data storage plan identifying the node subset and a file subset of a plurality of data storage files of the data shard to be merged into a larger data storage file, the data storage plan received from the primary computing node;

executing, by the computing node, the data storage plan by merging the data storage files of the file subset into the larger data storage file and uploading the larger data storage file to a global shared storage accessible by the computing nodes of the distributed database system, wherein execution of the data storage plan resolves fragmentation of data stored in the data shard resulting from queries being performed against the data, and wherein the primary computing node:

identifies which computing nodes of the node subset each have a current utilization satisfying an availability criterion, as candidate computing nodes, the candidate computing nodes including the computing node, by:

identifying a configuration of each computing node of the node subset within a resource pool, the configuration specifying the current utilization of the computing node; and selecting each computing node of which the current utilization satisfies the availability criterion, as one of the candidate computing nodes;

identifies which data storage files of the file subset each candidate computing node locally caches, comprising:

sending a message to the candidate computing node to receive information regarding the data storage files of the file subset that the candidate computing node locally caches; and receiving a reply from the candidate computing node including the information regarding the data storage files of the file subset that the candidate computing node locally caches; and selects the computing node to execute the data storage plan, based on the data storage files of the file subset that each candidate computing node locally cache.

10. The method of claim 9, further comprising:

receiving, by the computing node from the primary computing node, a message to send information regarding the data storage files of the file subset that the computing node locally caches; and sending, by the computing node to the primary computing node, a reply including the information regarding the data storage files of the file subset that the computing node locally caches.

11. The method of claim 10, wherein the information comprises:

a number of the data storage files of the file subset that the computing node locally caches.

12. The method of claim 10, wherein the information comprises a size of the data storage files of the file subset that the candidate computing node locally caches.

13. A distributed database system comprising:

a plurality of computing nodes; and a global storage storing a plurality of data shards of a database, each data shard including a plurality of data storage files and for which one of the computing nodes is a primary computing node responsible for the data shard, wherein the primary computing node for each data shard is to:

receive or generate a data storage plan for the data shard, the data storage plan identifying a file subset of the data storage files of the data shard to be merged into a larger data storage file, the data storage plan further identifying a node subset of the computing nodes subscribing to the data shard, the subset including the primary computing node;

identify which computing nodes of the node subset each have a current utilization satisfying an availability criterion, as candidate computing nodes, by:
- identifying a configuration of each computing node of the node subset within a resource pool, the configuration specifying the current utilization of the computing node; and
- selecting each computing node of which the current utilization satisfies the availability criterion, as one of the candidate computing nodes;

identify which data storage files of the file subset each candidate computing node locally caches, by:
- sending a message to the candidate computing node to receive information regarding the data storage files of the file subset that the candidate computing node locally caches; and
- receiving a reply from the candidate computing node including the information regarding the data storage files of the file subset that the candidate computing node locally caches;

select one of the candidate computing nodes to execute the data storage plan, based on the data storage files of the file subset that each candidate computing node locally caches; and cause the selected one of the candidate computing nodes to execute the data storage plan by merging the data storage files of the file subset into the larger data storage file and uploading the larger data storage file to a global shared storage accessible by the computing nodes of the distributed database system, wherein execution of the data storage plan resolves fragmentation of data stored in the data shard resulting from queries being performed against the data.

14. The distributed database system of claim 13, wherein the information comprises a number of the data storage files of the file subset that the candidate computing node locally caches.

15. The distributed database system of claim 13, wherein the information comprises a size of the data storage files of the file subset that the candidate computing node locally caches.

16. The distributed database system of claim 13, wherein the primary node for each data shard is to select the one of the candidate computing nodes to execute the data storage plan, based on the data storage files of the file subset that each candidate computing node locally caches, by:
- for each candidate computing node, computing a score based on a number of the data storage files that the candidate computing node locally caches and/or based on a size of the data storage files that the candidate computing node locally caches; and
- selecting the one of the candidate computing nodes to execute the data storage plan as the candidate computing node having a highest score.

* * * * *